UNITED STATES PATENT OFFICE.

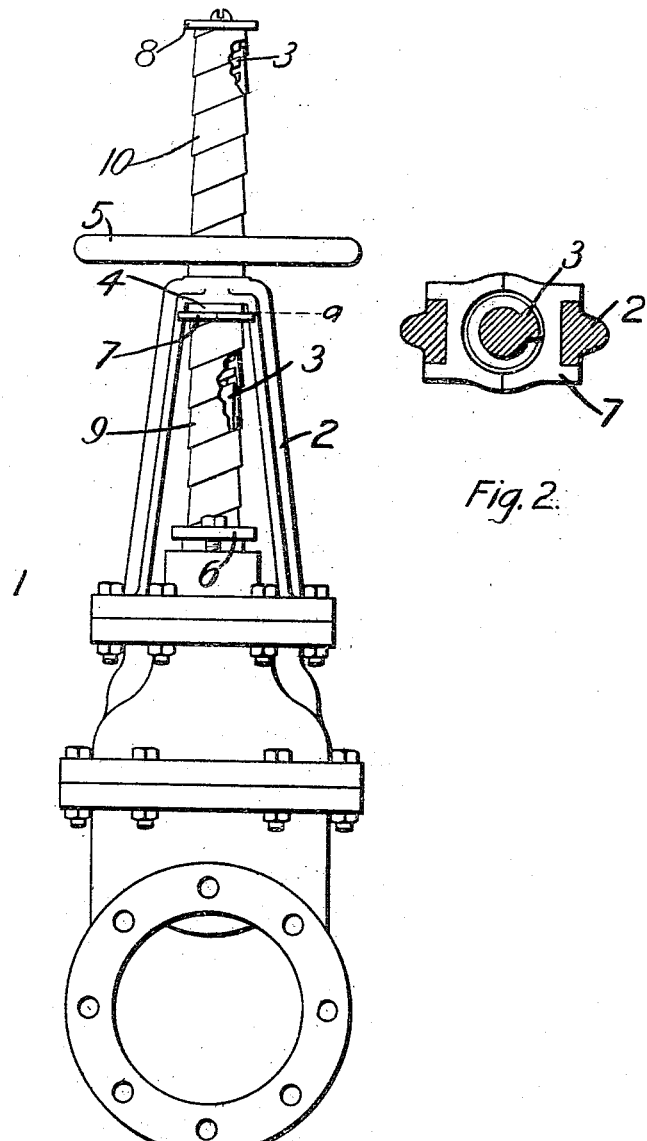

WILLIAM B. FULTON, OF MIDDLETOWN, OHIO.

GUARD FOR SCREWS AND RODS.

1,266,246.  Specification of Letters Patent.  Patented May 14, 1918.

Application filed December 3, 1917. Serial No. 205,220.

*To all whom it may concern:*

Be it known that I, WILLIAM B. FULTON, a citizen of the United States, residing at Middletown, Butler county, Ohio, have invented certain new and useful Improvements in Guards for Screws and Rods, of which the following is a specification.

This invention has reference to an improved guard or protecting rods, screws, etc., against fouling. As an illustration of the utility of my invention I would mention the valve-stem of a stop-valve of the gate type, which, from conditions of installation or from infrequent use, may become so fouled as to prevent ready operation of the valve. My improved guard is adapted to protect such a valve-stem from fouling, and I have thought well to exemplify my invention in connection with the stem of such a valve as has been referred to.

The invention will be readily understood from the following description taken in connection with the accompanying drawing in which :—

Figure 1 is an elevation of a stop-valve of gate type having its valve-stem provided with the improved guard, while Fig. 2 is a plan, somewhat enlarged, of the washer, the yoke and valve-stem appearing in transverse section in the plane of line *a* of Fig. 1.

In the drawing :—

1, indicates the stop-valve, as a whole; 2, its yoke; 3, the valve-stem; 4, the nut, journaled in the yoke; 5, the hand-wheel on the nut; and 6, the packing-gland, all of the parts thus far referred to being constructed in known manner, and subject to usual variations.

It is the undesired fouling of the valve-stem in such a structure that my improved guard is designed to prevent.

Proceeding with the drawing :—

7, indicates a two-part washer surrounding the valve-stem below the nut, and held against rotation; 8, a cap loosely swiveled to the upper end of the valve-stem; 9, a guard-sleeve encircling the valve-stem and having its ends engaging the washer and the packing-gland; and 10, a guard-sleeve encircling the valve-stem and having its ends engaging the cap and the nut.

The guard-sleeves are formed by the helical winding of a thin resilient metallic ribbon with its contiguous edges lapping. They form helical springs acting under compression whereby their ends are kept in contact with the abutments formed by the gland, washer, nut and cap, the resiliency and the telescopic character of the sleeves permitting the upper sleeve to automatically accommodate itself to variations in length of the upper part of the valve-stem, and permitting the lower sleeve to expand and contract endwise as the packing-gland is manipulated. The washer prevents the action of the nut torsionally upon the lower sleeve, and the freely swiveled cap permits of the ready rotation of the upper sleeve along with the nut. The two-part character of the washer permits its application to existing structures without dismantling the structures and the peculiar character of the sleeves permit of their being wormed into place on existing structures, without dismantling the structures, this latter feature being of special importance in many cases of already installed structures.

While the guard sleeves are helical springs the resiliency of the material of which they are formed need only be such as will maintain form. For instance, if the sleeves be applied in place by the worming process heretofore referred to, there is a necessary deformation during the process and the resiliency of the material should be such that the deformation does not transcend the elastic limit of the material. Again, in the illustrated case, the upper guard sleeve 10 becomes shortened when the valve is closed and when the valve is opened the material should have resiliency enough to restore it to its original length in case the self-expansion of the sleeve is depended upon to restore the original length. In other words, these guard sleeves, while spiral springs in reality, do not act as springs in the sense of transmitting force to or resisting movement of movable bodies. The guard-sleeves are not like what are often referred to as "spiral volute springs", for the latter have no essential overlapping contact of their contiguous turns, and each individual turn is smaller than the preceding one, the entire structure thus being given a frusto-conical form. My guard sleeves are substantially cylindrical structures, regardless of their length, but each individual convolution is frusto-conical in form so that one of its ends may enter and make contact with the interior of a succeeding convolution while its other end may surround and make contact with the exterior of a preceding convolution. By the expression "screws and rods" in the specification I mean rods either plain or screwed.

I claim:—

1. The combination of a rod provided with a pair of abutments subject to changes in distance apart, and a substantially cylindrical sleeve surrounding the rod between the abutments and formed of a helically wound resilient metallic ribbon with lapping contiguous edges, substantially as set forth.

2. The combination of a rod provided with a pair of abutments subject to changes in distance apart, means for turning one of said abutments relative to the other, a substantially cylindrical sleeve surrounding the rod between the abutments and formed of a helically wound resilient metallic ribbon with lapping contiguous edges, a two-part washer surrounding the rod between one of the abutments and the end of the sleeve, and means for preventing the turning of the washer, substantially as set forth.

3. The combination of a rod, an abutment rotatable relative thereto, a cap swiveled to the rod and adapted to take position at varying distances from the rotatable abutment, and a substantially cylindrical sleeve surrounding the rod between the abutment and cap and formed of a helically wound resilient metallic ribbon with lapping contiguous edges, substantially as set forth.

WILLIAM B. FULTON.

Witnesses:
J. PAUL SCUDDER,
M. S. BELDEN.

Copies of this patent may be obtained for five cents each, by addressing the "Commissioner of Patents, Washington, D. C."